A. H. KIRK.
SIEVE CLEANING DEVICE.
APPLICATION FILED OCT. 26, 1910.
989,713.
Patented Apr. 18, 1911.
3 SHEETS—SHEET 1.
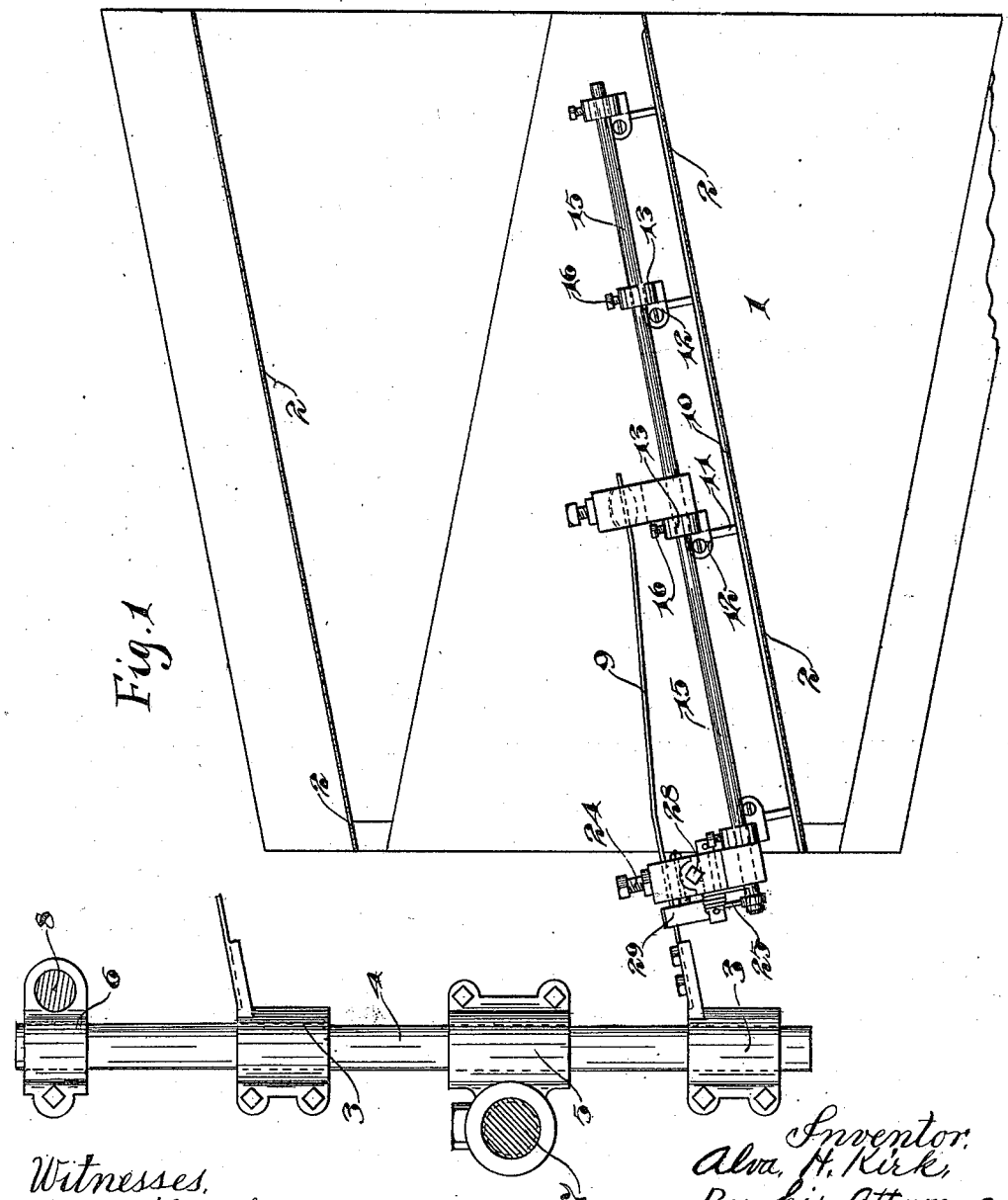

A. H. KIRK.
SIEVE CLEANING DEVICE.
APPLICATION FILED OCT. 26, 1910.
989,713.
Patented Apr. 18, 1911.
3 SHEETS—SHEET 2.
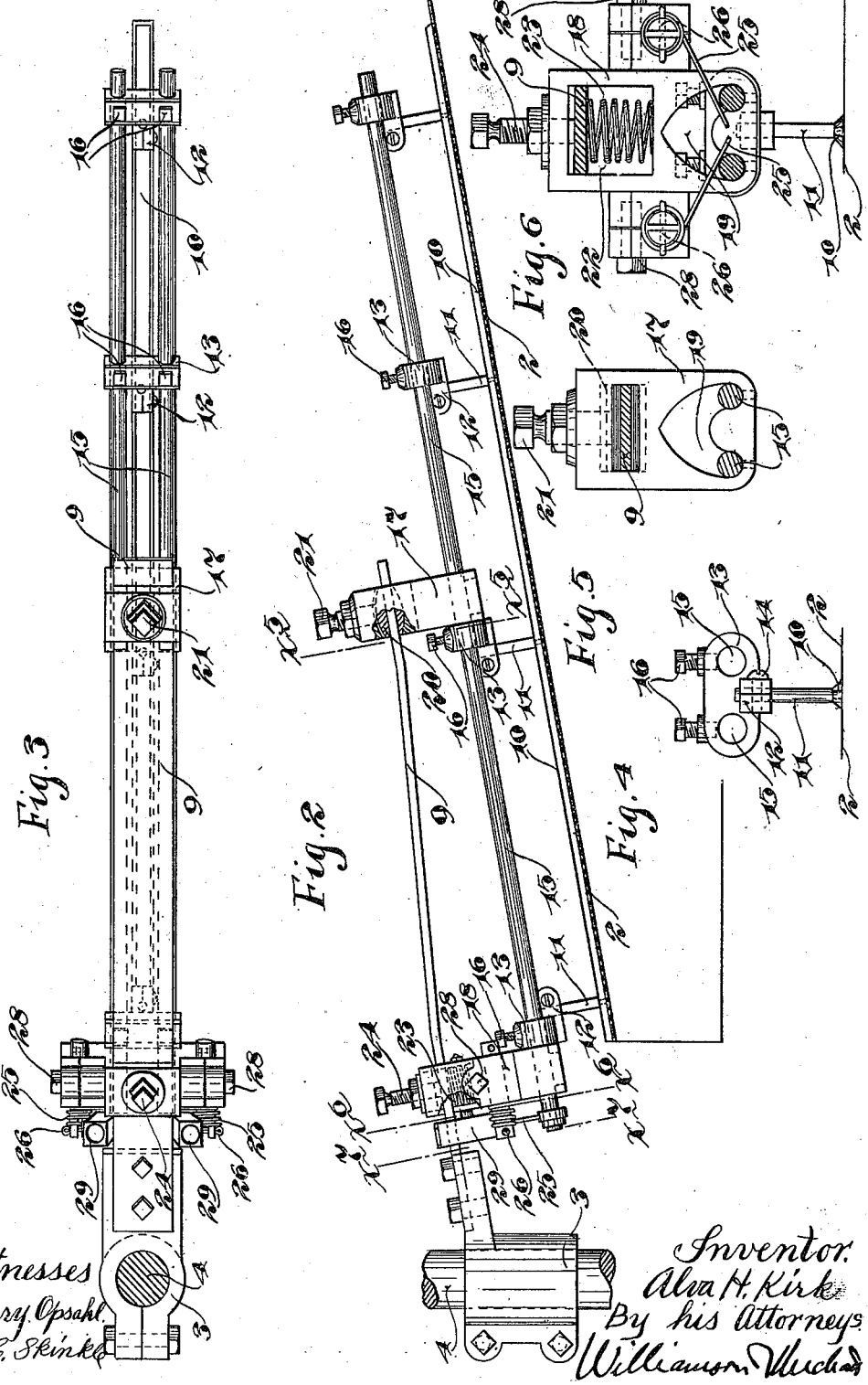

A. H. KIRK.
SIEVE CLEANING DEVICE.
APPLICATION FILED OCT. 26, 1910.
989,713.
Patented Apr. 18, 1911.
3 SHEETS—SHEET 3.
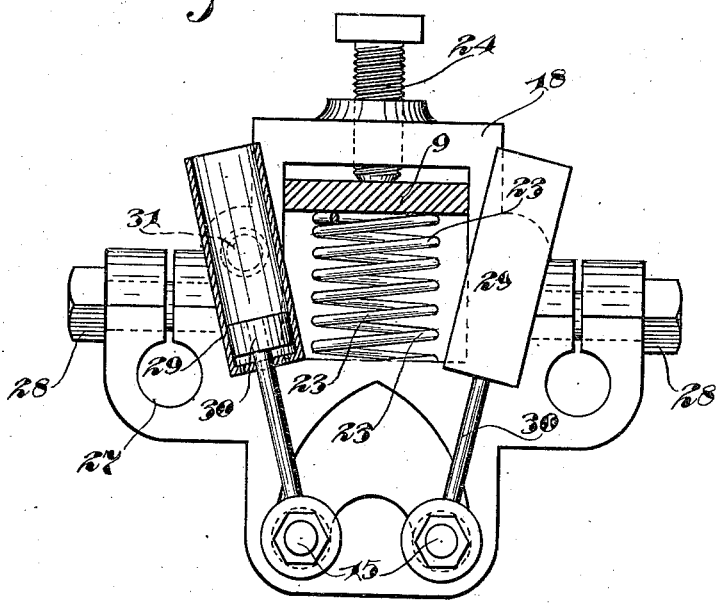
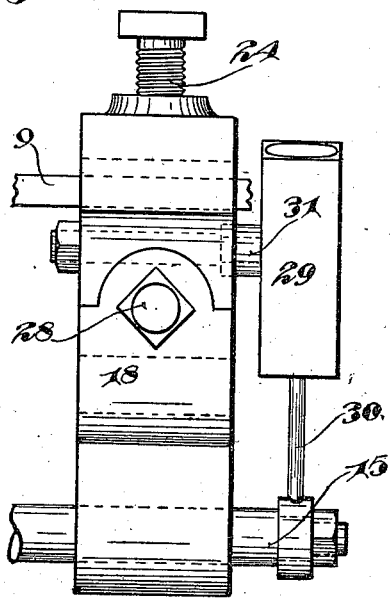
Witnesses
Harry Opsahl.
E. C. Skinkle
Inventor
Alva H. Kirk,
By his Attorneys.
Williamson Merchant

UNITED STATES PATENT OFFICE.

ALVA H. KIRK, OF MINNEAPOLIS, MINNESOTA.

SIEVE-CLEANING DEVICE.

989,713.  Specification of Letters Patent.  Patented Apr. 18, 1911.

Application filed October 26, 1910. Serial No. 589,158.

*To all whom it may concern:*

Be it known that I, ALVA H. KIRK, a citizen of the United States, residing at Minneapolis, in the county of Hennepin and State of Minnesota, have invented certain new and useful Improvements in Sieve-Cleaning Devices; and I do hereby declare the following to be a full, clear, and exact description of the invention, such as will enable others skilled in the art to which it appertains to make and use the same.

Generally stated, my invention has for its object to provide an improved sieve cleaning device, the term sieve being used in a sense broad enough to include any kind of screening medium. More particularly, however, the invention is directed to the improvement of sieve cleaning devices for grain cleaners or separators employing a scraper blade or bar mounted to sweep transversely over the sieve, somewhat on the plan disclosed in my prior Patent No. 479,816, of date August 2nd, 1892.

The novel features reside chiefly in the means for supporting the scraper blade; and the invention consists, generally, of the novel devices and combinations of devices hereinafter described and defined in the claims.

In the accompanying drawings which illustrate the invention, like characters indicate like parts throughout the several views.

Referring to the drawings, Figure 1 is a vertical section with some parts broken away, showing the sieve equipped shoe and one of my improved cleaning devices working over one of the shoe sieves; Fig. 2 is a view corresponding to Fig. 1 but on a larger scale, and showing only one of the sieves of the shoe, and with various parts broken away; Fig. 3 is a plan view of the sieve cleaning device shown in Fig. 2; Fig. 4 is an elevation looking at the extended end of the cleaning device; Fig. 5 is a transverse section taken approximately on the line $x^5$ $x^5$ of Fig. 2; Fig. 6 is a transverse section taken approximately on the line $x^6$ $x^6$ of Fig. 2; Fig. 7 is a transverse section taken approximately on the line $x^7$ $x^7$ of Fig. 2, some parts being removed and some parts being shown in full; and Fig. 8 is a side elevation of the parts shown in Fig. 7, some parts being broken away.

The sieve shoe is indicated by the numeral 1 and each employed sieve by the numeral 2. Any well known, or suitable means, not shown, may be employed for reciprocating the sieve shoe.

In practice, there will be one cleaning device for each sieve and these may be given the traveling scraping movements, preferably, transversely of the sieves, in various different ways, as, for instance, by the well known means wherein scraper supporting heads 3 are secured to an upright rod 4 having brackets 5 and 6 that engage, respectively, a horizontal feed screw 7 and horizontal guide rod 8. In the customary arrangement, means is provided whereby the feed screw 7, acting on the brackets 5, will impart slow traveling movements, first in one direction and then in the other, to the carrier made up of the parts just enumerated.

As preferably constructed, each sieve cleaning device comprises a flat metal carrying arm 9, one end of which is rigidly secured to a projection of the supporting head 3; and each such cleaning device, also includes a thin and flat scraper blade 10 having beveled edges and the flat under surface of which rides directly upon the coöperating sieve 2. This scraper blade 10 is riveted, or otherwise rigidly secured to the lower ends of short pins 11, the upper ends of which are detachably held in seats formed between clamping lugs 12 of tie brackets 13. The clamping lugs 12 are provided with screws 14 for tightening them onto the pins 11, and the so-called tie brackets 13, on opposite sides of the pins 11, are provided with perforations through which a pair of parallel rods 15 are passed. Said tie brackets 13 are shown as provided with set screws 16 for rigidly securing the same properly spaced on the rods 15. These rods extend parallel to the scraper blade 10, and they are fulcrumed in hanger blocks 17 and 18 in such a manner that when, by an obstruction caught in the sieve, the blade 10 is moved, say toward the right, the right hand rod 15 will be raised and the left hand rod will serve as the fulcrum or pivot, and when the said blade 10 is moved toward the left, the left hand rod will be raised and the right hand rod will then serve as the fulcrum or pivot. These shifting fulcrums, located one on each side of the scraper blade, serve to immediately raise the scraper blade from the sieve whenever it is moved in either direction from its intermediate operative position. It is desirable to have the scraper blade normally at a right angle to the sieve surface and, if a single fulcrum be provided therefor located in the plane of such blade, initial swinging movement of the blade would not perceptibly raise the free edge of the blade from the sieve surface. By providing the so-called shifting fulcrums, to-wit, a fulcrum located on each side of the scraper blade, the blade is so arranged that, under initial swinging movement thereof, its free edge will be immediately and rapidly raised away from the sieve surface. The swinging movement of the blade is on the fulcrum that is located on the opposite side of the blade from the direction in which the blade is moved or oscillated. To permit the above noted movements of the said rods 15, the hanger blocks 17 and 18 are formed with heart shaped openings or seats 19, shown in Figs. 5 and 6. The hanger block 17 engages the intermediate portions of the rods 15 and the hanger block 18 engages the lower end portions of said rods. The two hanger blocks 17 and 18 are supported from the carrying arm 9, preferably, by the following novel construction. In its upper portion, the hanger block 17 is provided with a pivotally adjustable bearing 20 through which the extended end of the arm 9 is freely passed, and the said bearing 20 is adapted to be held in position by a set screw 21 which works through the top of the said hanger block 17. The hanger block 18, above its seat 19 is formed with a large rectangular opening 22 through which the carrying arm 9 is passed, and a coiled spring 23 is interposed between the said arm and the lower portion of the said opening 22. A set screw 24 which works through the top of the hanger block 17 serves to adjust the said hanger block vertically, so that the scraper blade may be accurately adjusted to the inclination of the sieve 2. The carrying arm 9 will usually have more or less spring therein, but whether or not this is so, the above noted adjustment of the lower hanger block 18 is important for the purpose of adjusting the scraper blade 10 to the inclined sieve surface. The scraper blade may, of course, be given vertical adjustments bodily, by adjustments of the head 3 on the upright rod 4.

Yielding means is provided for holding the scraper blade normally in its intermediate operative position, and, preferably, this is accomplished by a pair of coil torsion springs 25 having downwardly pressed arms that engage the lower ends of the rods 15, as best shown in Fig. 6, and having their body portions anchored to adjusting pegs 26 that are rotatively mounted in seats formed in bifurcated projections 27 of the hanger block 18, as best shown in Fig. 7. These bifurcated projections 27 are provided with set screws 28 for rigidly clamping the said pegs 26 against rotation and in proper adjustments to give the desired tension of the springs 25. As best shown in Figs. 1 and 2, the two lower tie brackets 13 are located between and engaged with the hanger blocks 17 and 18 and hold the rods 15 against endwise movements in respect to said hanger blocks.

When the advance edge of the scraper blade comes into contact with an obstruction such, for instance, as a short stick or large kernel of grain, caught in one of the sieve meshes, it will oscillate backward in respect to the direction of travel of said scraper over the screen, and, as already stated, will, by its initial movements, rise rapidly away from the sieve surface. This initial movement of the scraper blade away from the sieve will tend to pull the grain or other obstruction out of the perforation or sieve mesh and it will generally accomplish this result. If it does not, however, the rising and receding movement of the scraper blade will permit the same to pass freely over such obstruction without doing any damage to the screen or sieve surface.

To prevent too rapid a return movement of the scraper blade to its normal intermediate position, and hence, to prevent the return movement of the scraper from kicking the grain off from the screen, I provide a retarding means, preferably, in the form of a pair of cylinders or dash pots 29 and coöperating pistons 30 working therein. As shown, the said cylinders 29 are pivoted at 31 to the sides of the hanger block 18, and the depending ends of the piston rods are pivoted to the lower ends of the respective fulcrum rods 15. As is evident, these dash pots will retard the action of springs 25 and cause the scraper blade to slowly return to its operative position, under the action of the said springs.

If the edge of the scraper blade 10 should become worn or require sharpening, it may be quickly removed from the supporting device simply by loosening the screws 14. Hence, another scraper blade may be quickly substituted for the one removed and the entire manipulation may be accomplished without throwing the sieve cleaning device out of action for more than a few moments.

What I claim is:

1. A sieve cleaning device having two fulcrums, located one on each side of the plane of said blade, and mounted to move in one direction on one of said fulcrums and in the other direction on the other of said fulcrums.

2. A sieve cleaning device adapted to travel over a sieve and comprising a scraper blade having two fulcrums, located one on each side of the plane of said blade, and mounted to oscillate in one direction on one of said fulcrums and to oscillate in the other direction on the other of said fulcrums.

3. A sieve cleaning device adapted to travel over a sieve and comprising a scraper blade having two fulcrums and mounted to oscillate in one direction on one of said fulcrums and to oscillate in the other direction on the other of said fulcrums, and a spring device yieldingly holding said scraper blade in its intermediate operative position.

4. A sieve cleaning device adapted to travel over a sieve and comprising a scraper blade having two fulcrums and mounted to oscillate in one direction on one of said fulcrums and to oscillate in the other direction on the other of said fulcrums, a spring device yieldingly holding said scraper blade in its intermediate operative position, and a retarding device rendering slow the return movement of said scraper blade to its intermediate operative position, under the action of said spring device.

5. A sieve cleaning device adapted to travel over a sieve and comprising a scraper blade having two fulcrums and mounted to oscillate in one direction on one of said fulcrums and to oscillate in the other direction on the other of said fulcrums, a spring device yieldingly holding said scraper blade in its intermediate operative position, and a dash pot and piston operative as a retarding device to render slow the return movement of the scraper blade to its intermediate operative position, under the action of said spring device.

6. The combination with a traveling carrier, of an oscillatory frame connected to said carrier by laterally spaced fulcrums, and a scraper blade carried by said oscillatory frame and located in a vertical space between the two fulcrums of said frame, whereby the said scraper blade will be raised immediately when oscillated in either direction.

7. In a sieve cleaning device, the combination with a carrying arm and hanger blocks thereon supported thereby, of an oscillatory frame having a pair of parallel fulcrum rods fulcrumed in said hanger blocks, and a scraper blade connected to said oscillatory frame.

8. In a sieve cleaning device, the combination with a carrying arm having bearings thereon, of a scraper blade connected to said bearings for oscillatory movements, and means for adjusting said scraper blade in the plane of said carrying arm, to thereby adjust said blade to the inclination of the sieve to be cleaned.

9. In a sieve cleaning device, the combination with a carrying arm and hanger blocks supported thereby, one of the said blocks being vertically adjustable, of an oscillatory frame connected to said hanger blocks by laterally spaced fulcrums, and a scraper blade connected to said oscillatory frame, substantially as described.

10. In a sieve cleaning device, the combination with a carrying arm, a pair of hanger blocks carried thereby, one thereof being vertically adjustable on said arm and being spring pressed downward in respect thereto, of an oscillatory frame connected to said hanger blocks by laterally spaced fulcrums, and a scraper blade connected to the said oscillatory frame.

11. In a sieve cleaning device, the combination with a carrying arm, a traveling support therefor, of a pair of hanger blocks mounted on said arm, of an oscillatory frame having laterally spaced rods independently fulcrumed in the said hanger blocks, and a scraper blade carried by said oscillatory frame.

12. In a sieve cleaning device, the combination with a carrying arm, a traveling support therefor, and a pair of hanger blocks mounted on said arm, of an oscillatory frame having laterally spaced rods independently fulcrumed in the said hanger blocks, a scraper blade carried by said oscillatory frame, and independent springs applied to one of the said blocks operative on each of the said frame rods.

13. In a sieve cleaning device, the combination with a carrying arm, a traveling support therefor, and a pair of hanger blocks mounted on said arm, of an oscillatory frame having laterally spaced rods independently fulcrumed in the said hanger blocks, a scraper blade carried by said oscillatory frame, independent springs applied to one of the said blocks and operative on each of the said frame rods, and dash pots and pistons affording independent connections between the two rods of said oscillatory frame and one of the said hanger blocks.

14. In a sieve cleaning device, the combination with a carrying arm and a traveling support therefor, and hanger blocks carried by said arm, of an oscillatory frame made up of parallel rods and tie brackets connecting the same, the said rods being mounted in seats in the said hanger blocks and constituting laterally spaced fulcrums, and a scraper blade detachably connected to the tie brackets of said oscillatory frame.

In testimony whereof I affix my signature in presence of two witnesses.

ALVA H. KIRK.

Witnesses:
- HARRY D. KILGORE,
F. D. MERCHANT.

---

Copies of this patent may be obtained for five cents each, by addressing the "Commissioner of Patents, Washington, D. C."